US005545886A

United States Patent [19]
Metlitsky et al.

[11] Patent Number: 5,545,886
[45] Date of Patent: Aug. 13, 1996

[54] BARCODE SCANNER USING AN ARRAY OF LIGHT EMITTING ELEMENTS WHICH ARE SELECTIVELY ACTIVATED

[75] Inventors: Boris Metlitsky; Joseph Katz, both of Stony Brook, N.Y.; Emanuel Marom, Tel Aviv, Israel; Dean Gousgounis, Commack, N.Y.

[73] Assignee: Symbol Technologies Inc., Holtsville, N.Y.

[21] Appl. No.: 98,991

[22] Filed: Jul. 29, 1993

Related U.S. Application Data

[62] Division of Ser. No. 864,367, Apr. 6, 1992, Pat. No. 5,258,605, which is a continuation of Ser. No. 493,134, Mar. 13, 1990, abandoned.

[51] Int. Cl.$^6$ ........................................ G06K 7/10
[52] U.S. Cl. .................... 235/462; 235/470; 235/472
[58] Field of Search ............................ 235/471, 462, 235/472, 470; 358/475; 250/553, 552, 568

[56] References Cited

U.S. PATENT DOCUMENTS

| 3,680,049 | 7/1972 | Tsukada | 250/553 |
|---|---|---|---|
| 3,736,410 | 5/1973 | Ragland et al. | 250/569 |
| 3,801,775 | 4/1974 | Acker | 235/471 |
| 3,812,325 | 5/1974 | Schmidt | 235/462 |
| 3,819,910 | 6/1974 | Scantlin | 235/454 |
| 3,946,205 | 3/1976 | Melugin et al. | 235/476 |
| 4,040,740 | 8/1977 | Handtmam et al. | 356/4 |
| 4,057,784 | 11/1977 | Tafoya | 235/462 |
| 4,135,663 | 1/1979 | Nojiri et al. | 235/463 |
| 4,195,772 | 4/1980 | Nishimura | 235/462 |
| 4,217,487 | 8/1980 | Kjeer | 235/455 |
| 4,251,798 | 2/1981 | Swartz et al. | 340/146.357 |
| 4,315,245 | 2/1982 | Nakahara et al. | 235/455 |
| 4,369,361 | 1/1983 | Swartz et al. | 235/470 |

(List continued on next page.)

FOREIGN PATENT DOCUMENTS

| 0460609 | 12/1991 | European Pat. Off. | 235/462 |
|---|---|---|---|
| 3839772 | 5/1990 | Germany . | |
| 62-150486 | 7/1987 | Japan . | |
| 63-198177 | 8/1988 | Japan . | |
| 1-152683 | 6/1989 | Japan . | |
| WO89/06016 | 6/1989 | WIPO . | |

OTHER PUBLICATIONS

Sekii et al, "Semiconductor Laser Digital Scanner", SPIE Proceedings vol. 1028, Conf. on Scanning Imaging, Sep. 21–23, 1988.

Dickson et al., Scanner With Tandem Stationary Holographic Disc, (Jan. 1981).

Fujimoto et al., "Semiconductor Laser Digital Scanner", Mar. 1990, Optical Engineering, vol. 29, pp. 230–232.

*Primary Examiner*—Tan T. Nguyen
*Attorney, Agent, or Firm*—Finnegan, Henderson, Farabow, Garrett & Dunner, L.L.P.

[57] ABSTRACT

A bar code scanner employs an electronic means for causing the light beam to scan a bar code symbol, rather than using a mechanical device to generate the scan. A linear array of light sources, activated one at a time in a regular sequence, may be imaged upon the bar code symbol to simulate a scanned beam. Instead of a single linear array of light sources, a multiple-line array may be employed, producing multiple scan lines. The multiple scan lines may be activated in sequence, or activated simultaneously (time-division or frequency-division multiplexed. The multiple scan lines can provide signal enhancement, noise reduction or fault correction if directed to the same bar code pattern. Multiple scan lines may be generated using a single light source and a beam splitter, with mechanical scanning, as well as by the sequentially-activated light sources. Multiple simultaneous scan lines may be employed to generate a raster scan at lower mechanical scan frequency. In another embodiment, a tunable laser may be employed to provide a scan without moving parts; a laser beam from the tunable laser is reflected from a diffraction grating that produces an angular deviation dependent upon the wavelength of the laser output. As the frequency of the tunable laser is varied in some selected pattern, the laser beam will scan accordingly.

14 Claims, 8 Drawing Sheets

U.S. PATENT DOCUMENTS

| | | | |
|---|---|---|---|
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,473,746 | 9/1984 | Edmonds | 235/462 |
| 4,481,667 | 11/1984 | Price et al. | 235/455 |
| 4,496,831 | 1/1985 | Swartz et al. | 235/472 |
| 4,548,463 | 10/1985 | Cato et al. | 235/457 |
| 4,591,242 | 5/1986 | Broockman et al. | 235/457 |
| 4,593,186 | 6/1986 | Swartz et al. | 235/472 |
| 4,605,846 | 8/1986 | Duret et al. | 235/456 |
| 4,629,876 | 12/1986 | Kubota et al. | 235/462 |
| 4,673,805 | 6/1987 | Shepard et al. | 235/472 |
| 4,698,797 | 10/1987 | Komatsu | 369/116 |
| 4,734,566 | 3/1988 | Senda et al. | 235/455 |
| 4,736,095 | 4/1988 | Shepard et al. | 235/472 |
| 4,743,773 | 5/1988 | Katana et al. | 235/472 |
| 4,758,717 | 7/1988 | Shepard et al. | 235/472 |
| 4,760,248 | 7/1988 | Swartz et al. | 235/472 |
| 4,806,742 | 2/1989 | Swartz et al. | 235/472 |
| 4,813,034 | 3/1989 | Mashimo | 369/116 |
| 4,818,856 | 4/1989 | Matsushima et al. | 235/462 |
| 4,897,532 | 1/1990 | Swartz et al. | 235/467 |
| 4,900,907 | 2/1990 | Matsushima et al. | 235/462 |
| 4,933,538 | 6/1990 | Heiman et al. | 235/462 |

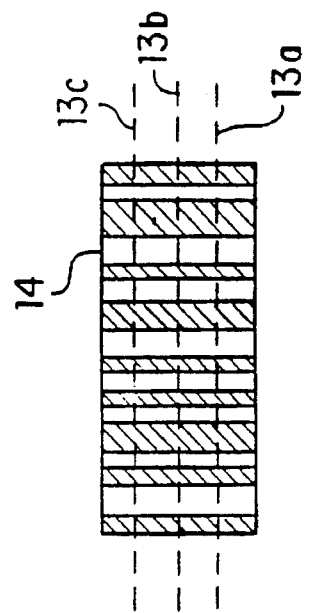
FIG. 16
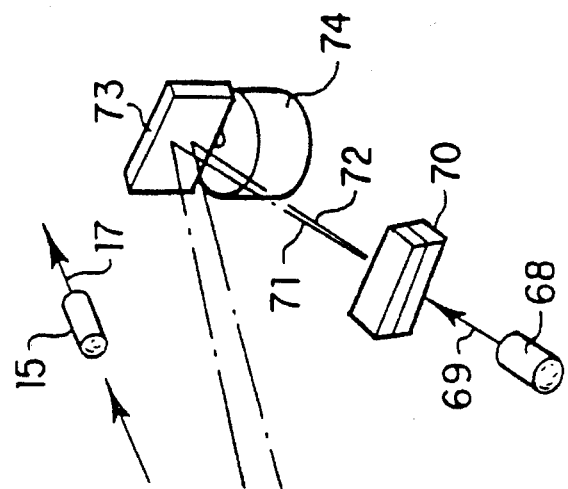
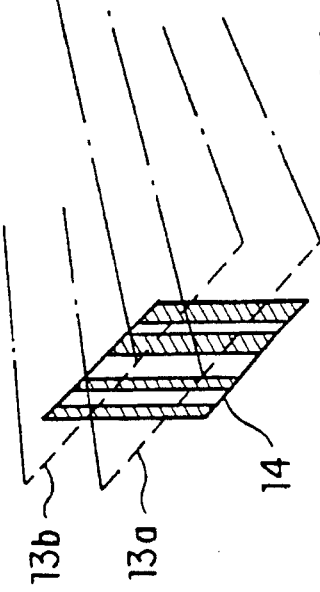
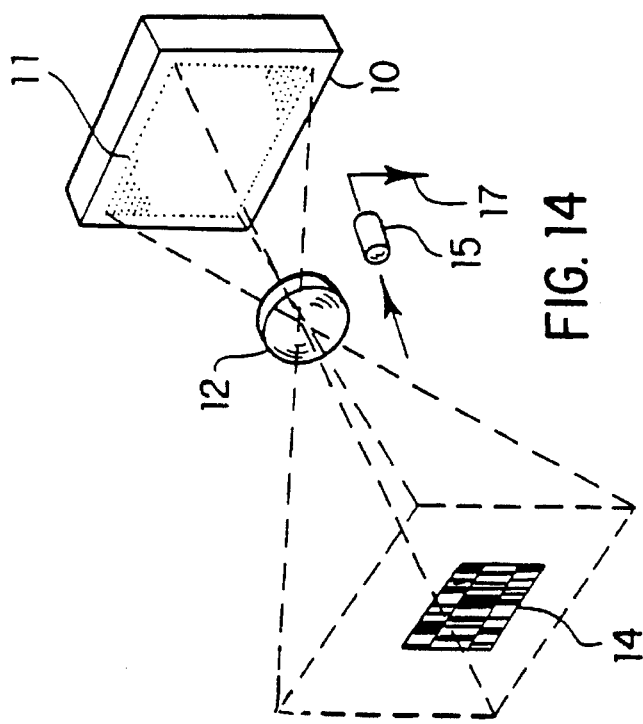
FIG. 14
FIG. 15

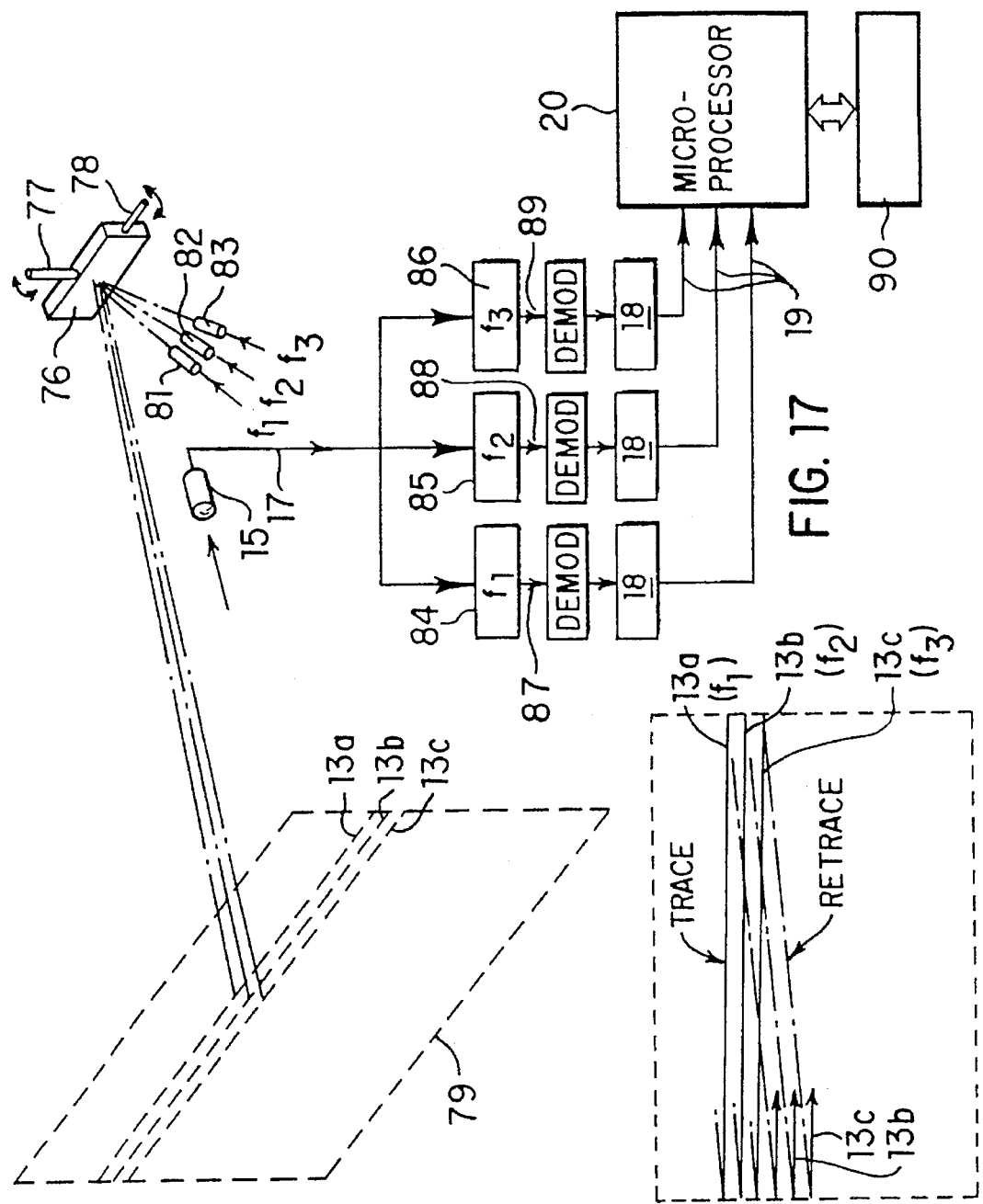

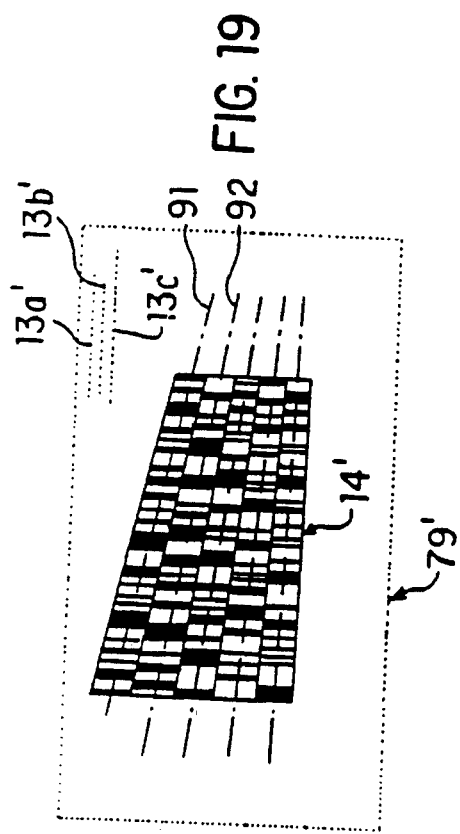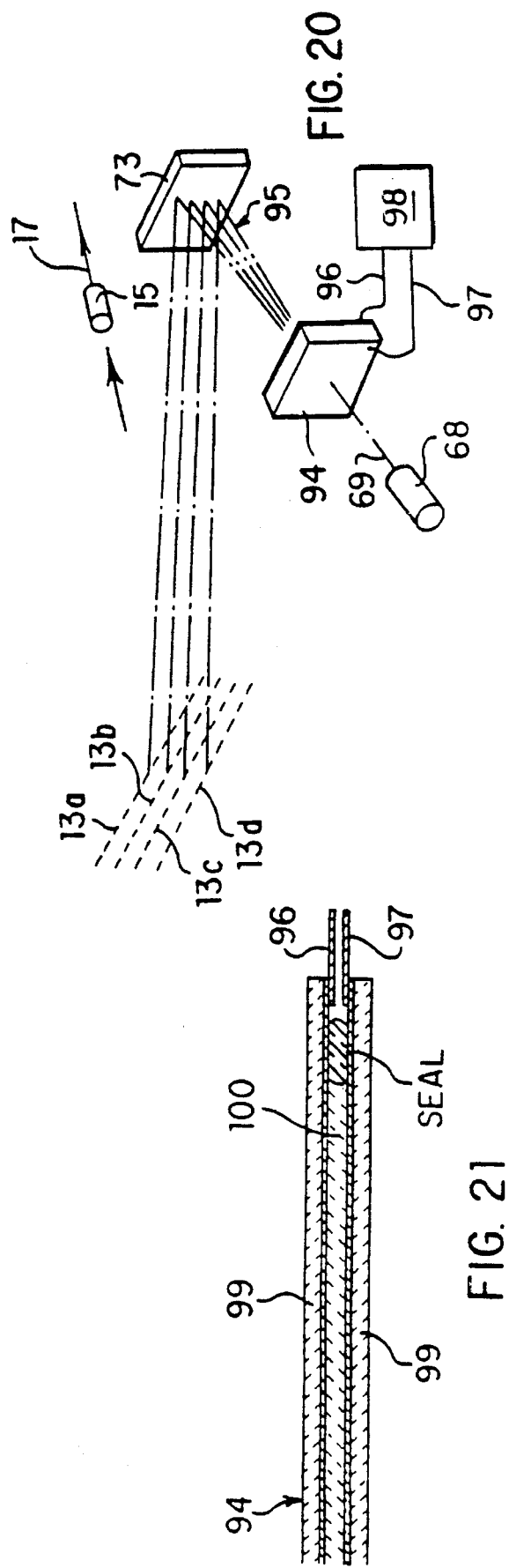

BARCODE SCANNER USING AN ARRAY OF LIGHT EMITTING ELEMENTS WHICH ARE SELECTIVELY ACTIVATED

This application is a divisional of Ser. No. 864,367 filed Apr. 6, 1992, now U.S. Pat. No. 5,258,605, which was a continuation of Ser. No. 493,134, filed Mar. 13, 1990 and now abandoned.

BACKGROUND OF THE INVENTION

This invention relates to bar code reader devices, and more particularly to apparatus for generating a scanned light beam for use in reading bar code symbols.

Bar code readers are disclosed in U.S. Pat. Nos. 4,387,297, 4,409,470, 4,251,798, and 4,760,248, all; assigned to Symbol Technologies, Inc. The bar code readers described in these patents, as well as other devices of this type that are commercially available, usually employ oscillating mirrors or similar mechanical means to generate a scanning pattern. While such devices are widely used in retail and other business establishments today and have been quite successful in accomplishing their objectives, there is nevertheless a continuing requirement to improve reliability, reduce power consumption, reduce size and weight, lower the parts cost and manufacturing cost, and increase the speed and accuracy of operation. One of the elements of the prior bar code scanners most susceptible to improvement along these lines is the mechanical scanner device. The scanner devices may consist of a mirror mounted on a stepper motor; the mirror includes a flat portion to direct the outgoing laser beam and also a concave portion to collect reflected light and focus it upon a photodetector.

Bar code readers employ decoding circuitry to interpret the signals produced by a photodetector receiving the reflected light from the bar code symbol. Conventional decoding schemes rely upon data collected by a single scanning spot moved linearly across the field where the bar code symbol is located. The bar code data is embedded in background noise, and the decoding circuitry is more effective if the signal can be enhanced. To this end, faster scanning rates would permit the implementation of multiple scans to increase reliability of the data collected, but the mechanical scan generators previously used constrict the speed and thus place limitations on the multiple scan approach.

It is the principal object of the invention to provide a bar code reader or the like that does not require mechanical devices such as oscillating mirrors to cause a light beam to scan a symbol to be read. Another object is to provide a bar code reader that is capable of faster scan, as by implementing the scan with no moving parts. A further object is to take advantage of fast scanning techniques to provide multiple scans to thereby increase the signal recovery ability, i.e, increase the likelihood of recovering a valid decode of the bar code signal. In addition, the capability of providing multiple scans using a fast scan method permits improved facility for reading two dimensional bar code symbols of the type having multiple rows of bar code patterns. Other objects include reducing the size, weight and power consumption of a laser scan type of bar code reader, as well as reducing the manufacturing cost and increasing the reliability and operating lifetime of such devices.

SUMMARY OF THE INVENTION

In accordance with one embodiment of the invention, a bar code scanner is provided that uses electronic means to cause a light beam to scan (move across) a bar code symbol to be read. The electronic means for scanning a bar code symbol is used in place of the conventional mechanical device to generate the scan. In one embodiment, a linear array of light sources, activated one at a time in a regular sequence, produces a rapid series of single-spot beams that are imaged upon the bar code symbol to simulate a scanned beam. Or, a tunable laser may be employed, along with a diffraction grating that produces an angular deviation dependent upon the wavelength of the laser output; as the frequency of the laser is varied in some selected pattern, the laser beam will scan accordingly. The speed of the scan can be much more rapid than possible with mechanical scan devices, and the pattern of the scan can be adaptively adjusted to the particular symbol and position. A scanner with no moving parts can provide an increase in reliability, although in some of the embodiments disclosed a scanning mirror is advantageously employed. Improvements in power drain, size, shape and weight resulting from use of features of various embodiments of the invention provide bar code reader devices of enhanced utility.

The faster scan allowed by employing no moving parts for generating the scan line permits multiple scans to be generated in the time of a single scan in conventional equipment. This facility of providing multiple scans allows the signal to be decoded, i.e., the electrical input from the photodetector, to be enhanced. Multiple scans at vertically-spaced positions on the bar code symbol, with the photodetector output being a composite of the returns from all the scans, will be more likely to avoid erroneous readings due to defects in the symbol or background noise. Alternatively, the multiple scan lines may be used for reading two dimensional bar code symbols having multiple rows of bar-space patterns. Multiple scan lines may be implements with mechanical scan generation such as an oscillating mirror, instead of with the scan generation having no moving parts as discussed above, thus providing the same advantages of signal enhancement and fault tolerance in signal decoding. The multiple scan lines may be created by using multiple light sources, or by employing a single light source and a beam splitter. A liquid crystal device used as the beam splitter may dynamically change the number of scan lines by varying the magnitude or frequency of voltage applied across the plates of the holding the liquid crystal material.

According to another feature of the use of multiple scan lines in a bar code reader or the like, a raster type scan of a field may be generated with mechanical scanning elements, and, since multiple lines are generated for each scan, the frequency of the mechanical scanning element may be reduced. The reflected light from the multiple simultaneous scan lines is separated by first modulating each scan line at a different frequency then using band-pass filters to recover the different signals.

BRIEF DESCRIPTION OF THE DRAWINGS

The novel features characteristic of the invention are set forth in the appended claims. The invention itself, however, as well as other features and advantages thereof, will be best understood by reference to a detailed description of specific embodiments, when read in conjunction with the accompanying drawings, wherein:

FIG. 10 is a timing diagram showing events or voltage vs. time for certain occurrences in the system of FIG. 7;

FIG. 14 is a pictorial view of a bar code scanner system as in FIG. 7 but employing a two-dimensional array of light sources according to another embodiment of the invention;

FIG. 15 is a pictorial view of a bar code scanner system corresponding to FIG. 7, employing two scan lines, but using a single light source along with a beam splitter;

FIG. 16 is a diagram of a bar code symbol scanned with three scan lines;

FIG. 17 is a pictorial view of a bar code scanner system as in FIG. 7 for scanning a two-dimensional field, employing multiple simultaneous scan lines, according to another embodiment of the invention;

FIG. 18 is a diagram of a field including a bar code symbol, scanned by the system of FIG. 17;

FIG. 19 is a diagram of a bit-mapped memory containing data recovered from scanning a field such as that of FIG. 18 using the system of FIG. 17;

FIG. 20 is a pictorial view of a bar code scanner system corresponding to FIGS. 7 or 15, employing multiple scan lines, using a single light source along with a liquid crystal device as beam splitter, according to another embodiment of the invention; and FIG. 21 is an elevation view in section of the liquid crystal device of FIG. 20.

DETAILED DESCRIPTION OF SPECIFIC EMBODIMENTS

Figure 1:
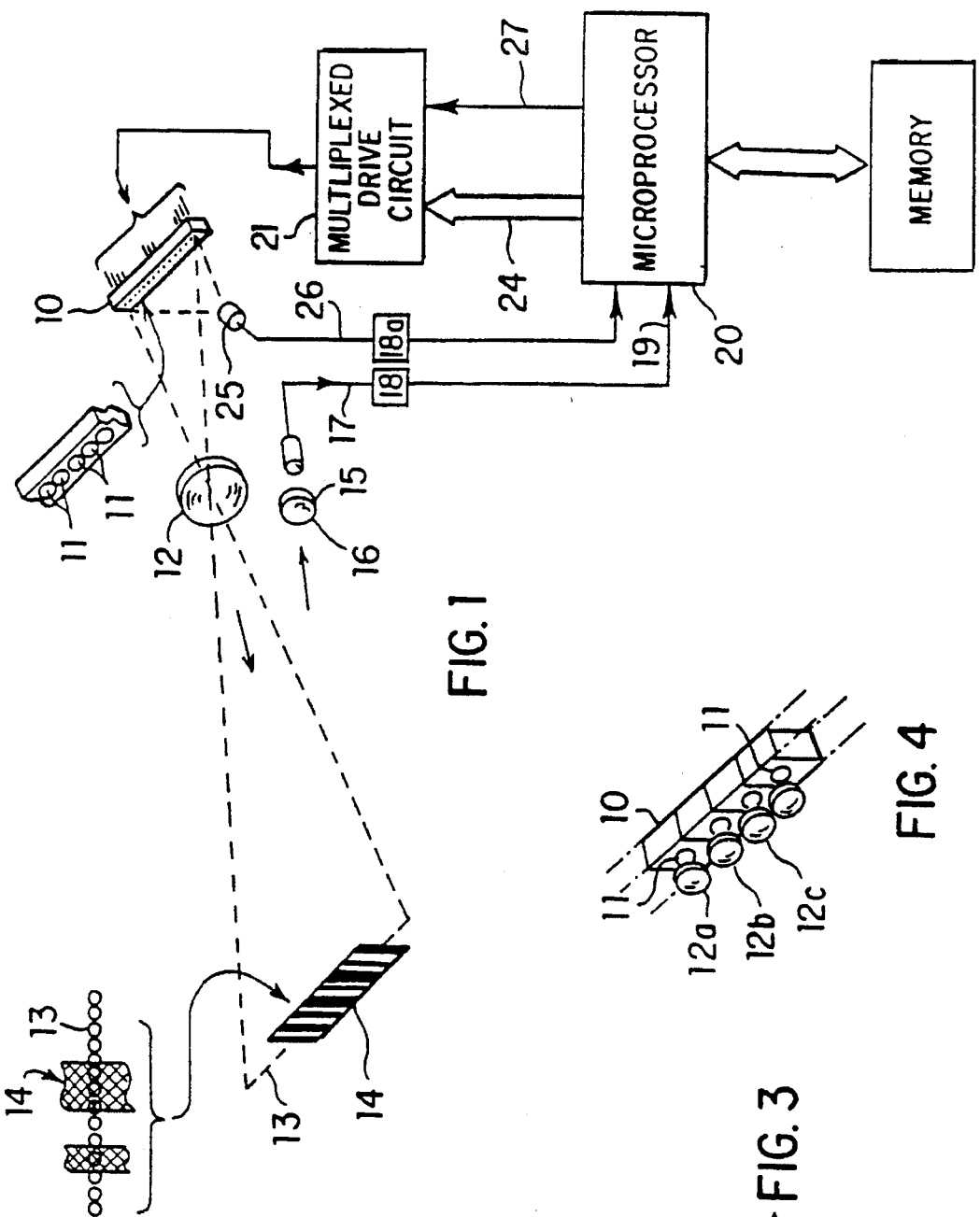
FIG. 1 is a diagram in schematic form of a bar code scanner employing a linear array of light sources instead of a single light source and mechanical scanning, according to one embodiment of the invention.

Referring to FIG. 1, a bar code scanner according to one embodiment of the invention employs a linear array 10 of laser diodes or LEDs 11 that are activated one at a time in sequence. U.S. Pat. No. 4,445,125 shows a linear array of laser diodes formed on a common substrate, as may be used as the array 10. The light output from the array 10 is focused by a suitable lens system 12 onto a line 13 at the focal plane of the lens system, i.e., the image of the array 10 will appear as a line 13 scanning across the focal plane. A target such as a bar code symbol 14 is scanned by the line 13, where the light beam scanning the line 13 functions just as the laser scan used in more conventional bar code readers. The advantage of the scanning arrangement of FIG. 1, however, is that there are no moving parts, and also the scan rate can be much faster than if limited by mechanical oscillating mirrors or the like. The spot size shown for the scan line 13 is merely illustrative; the actual spot size representing the images of the diodes 11 may be the same size or larger than the minimum dimensions of the bars and spaces.

Figure 2:
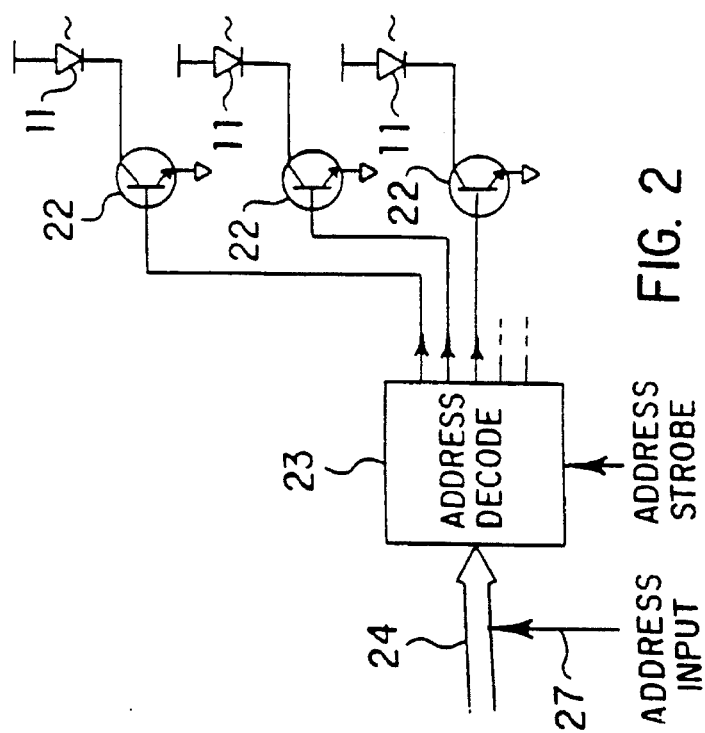
FIG. 2 is an electrical diagram in schematic form of a part of the system of FIG. 1.

Light reflected from the bar code symbol 14 is focused upon a photodetector diode 15 through a lens system 16, producing an analog electrical output serially on a line 17, and this serial output is shaped via wave-shaping circuitry 18 to produce a square-wave type of signal on a line 19 to be then decoded in the usual manner to identify the bar code symbol. A microprocessor device 20 is used to drive the array 10 by way of a multiplexed drive circuit 21, and also used to decode the detected and shaped bar code signal on the line 19. The drive circuit 21 may consist of a number of transistors 22 as seen in FIG. 2, each being connected in series with one of the diodes 11 of the array 10; the base-emitter circuits of the transistors 22 are driven from a decoder 23 that receives a one-of-N address signal on lines 24 from the microprocessor 20 to activate a particular one of the diodes 11; in this manner, the diodes 11 can be turned on one at a time in a rapid sequence, starting at one end of the array and proceeding to the other. The pulse width used to drive the base of a transistor 22 to turn on a diode 11 may be variable by feedback based on reflected light, as described below.

Figure 3:
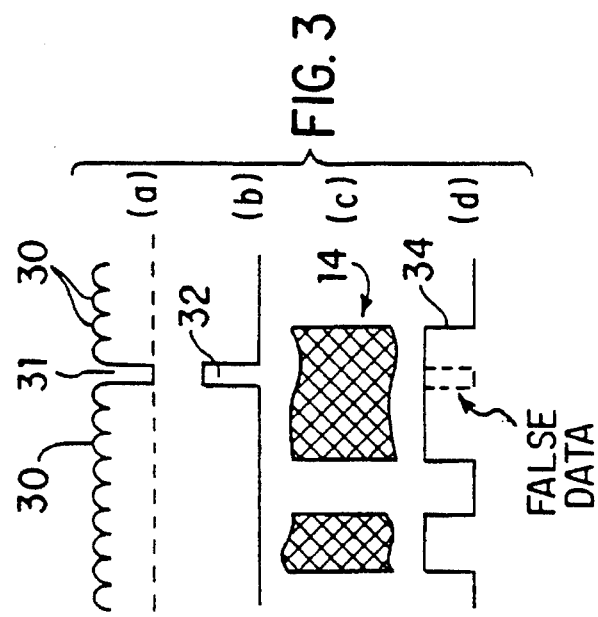
FIGS. 3a–3d are timing diagrams showing events vs. time for various events or voltages in the device of FIGS. 1 and 2.

A monitoring photodiode 25 is positioned in the reader housing to detect the overall light output from the light-emitting diodes 11, using a suitable optic arrangement, if necessary. The electrical output from this photodiode 25 is applied by a line 26 and a wave shaper or digitizer 18a to an input of the microprocessor 20. This monitoring photodiode 25 performs two tasks. First, the output power of the laser diodes or LEDs 11 can be maintained in the proper range by adjustment of the pulse width of the driving current pulses, e.g., by an address strobe applied to the decoder 23 from the microprocessor 20 via a line 27. Feedback to adjust the pulse width used to drive the transistors 22 is thus provided. Or, the drive current for the diodes 11 could be adjusted by varying the level of the power supply to the diodes 11. Second, the monitoring photodiode 25 supplies an input to the microprocessor 20 for use in fault detection and correction; if one or more of the laser diodes 11 is faulty and does not produce any light output, then the position or spot in the scan line 13 where this laser diode was supposed to have illuminated is always dark and so is interpreted as a black bar in the return signal even though the bar code symbol 14 actually may have a white space in this position. To prevent this incorrect interpretation, the microprocessor 20 is programmed to ignore or "blank" any signal on the input line 17 during the time slot of the faulty diode or diodes. Referring to FIG. 3a, the electrical output of the monitoring photodiode 25 on line 26 should be a continuous series of overlapping or juxtaposed pulses 30, but where there is a faulty diode there will be a space 31, and so the microprocessor generates a blanking period 32 as seen in FIG. 3b. A bar code symbol 14 as seen in FIG. 3c should return a signal 33 on line 17 as seen in FIG. 3d, but the return during the blanking period 32 is false, so this input is ignored or considered to be either black or white; if the code can be decoded with this ambiguity, then a valid reading is possible, if not, then a false reading is at least avoided and another shot by the user, or an automatic rescan without user intervention, may produce a valid reading. In any event, a fault can be signalled so the user can return the reader unit for repair.

Figure 4:
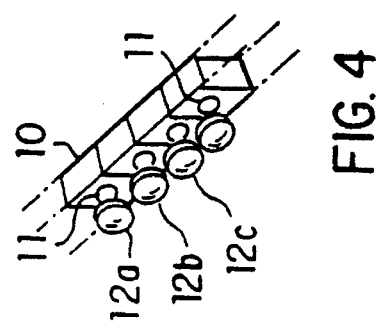
FIG. 4 is an enlarged view of a part of the linear array of light sources of FIG. 1, according to another embodiment.

As seen in FIG. 4, the optical system used to focus the array 10 upon the focal plane of the bar code symbol 14 may employ a large number of individual lenslets 12a, 12b, etc., one for each laser diode 11, for collimating the light from each diode. Each of the lenslets 12a, 12b, etc., is individually positioned to collimate the light for one diode, then a lens 12 is used to focus a single spot for each diode onto the focal plane where the bar code symbol 14 is expected to be, to thereby create the line 13 of spots as before. The array 10 may be formed of a semiconductor chip having a number of laser diodes or LEDs formed thereon, rather than by separate devices as illustrated; in such case the physical size of the line of light sources 11 would be small and so magnification by the lens system 12 would be ample to create the desired length of the scan line 13. In order to create a smooth transition between spots in the scan line 13 of FIG. 1, instead of the sequence of delineated dots illustrated in the enlarged view of scan line 13, the image of the linear array 10 may be slightly defocused at the position of the scan line 13.

Figure 5:
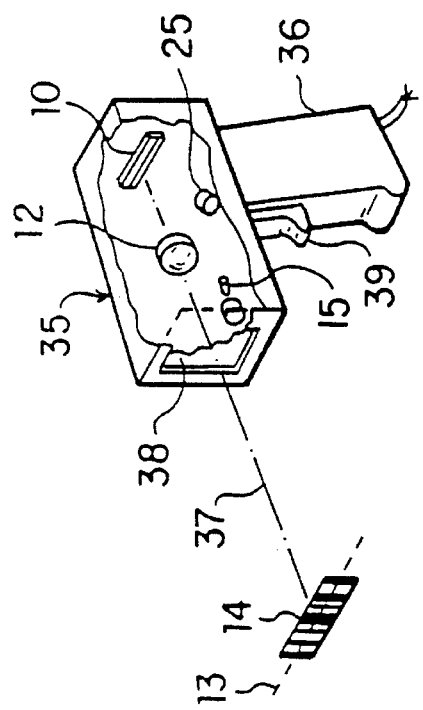
FIG. 5 is a pictorial view, partly broken away, of the device of FIGS. 1–4 mounted in a hand-held portable bar code reader unit.

Referring now to FIG. 5, the bar code scanner of FIG. 1–4 may be mounted in a portable hand-held unit 35 having a handle 36 gripped by the user. The laser scan beam 37 generated by the linear array 10 exits through a window in the front of the unit, and the reflected light from the bar code symbol 14 also enters by this window to reach the photodetector 15. The microprocessor 20 and other circuitry of FIGS. 1 and 2 are mounted on a circuit board within the unit 35, as well as a battery if the unit is self-powered. The unit 35 is coupled to a central station by an RF link or by a wire cable. A finger-activated trigger switch 39 is employed to activate the scan, detect and decode functions when the user points the unit 35 toward a symbol 14.

The scanner of FIG. 1–5 can operate at very high rates. If there are N laser diodes 11 in the array 10, and $T_p$, is the pulse width applied to each laser diode via its transistor 22, the number of scans per second is $$n_{scan} = \frac{1}{NT_p}$$

and for N=100 and $T_p$=1 μs the scan rate is $10^4$ scans/sec. The value of $T_p$ can be changed in real time to vary the scan rate.

Using the scanner device of FIGS. 1–5 with no moving parts, the scan pattern can be flexibly adapted; for example, if the bar code is recognized to occupy only a fraction of the full scan line 13, power can be conserved by applying drive current only to the transistors 22 for laser diodes 11 that actually illuminate the bar code symbol 14 itself. Similarly, more scans can be applied to a small portion of the bar code symbol by limiting the addressing applied to the multiplex drive circuit 15 if decoding of the signal on line 17 indicates an ambiguity for this portion.

Figure 6:
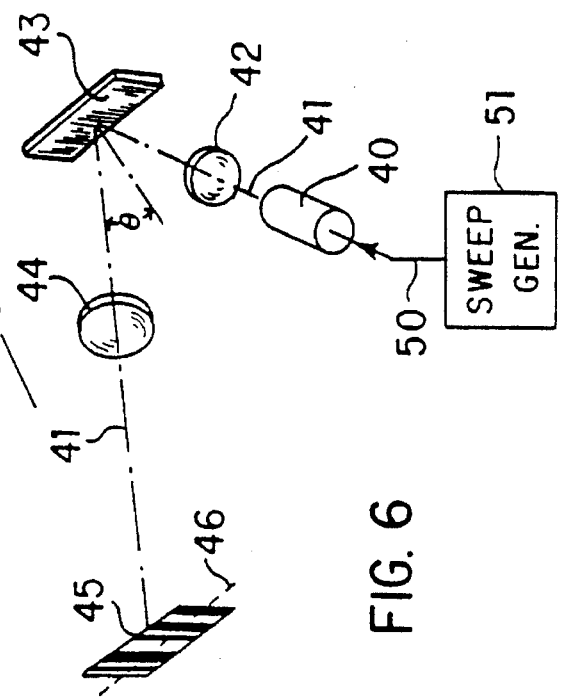
FIG. 6 is a diagram in schematic form of a bar code scanner using no moving parts according to another embodiment of the invention employing a diffraction grating.

Referring to FIG. 6, another embodiment of a bar code reader that has no moving parts is illustrated. A tunable laser diode 40 or laser tube produces a laser beam 41 that passes through a suitable lens system 42 to impinge upon a diffraction grating 43, from which the beam is reflected trough another lens system 44 to be focussed upon the plane of a bar code symbol 45.

The diffraction grating 43 has the property of reflecting at an angle dependent upon the wavelength of the light produced by the laser 40, so by varying the tuning of the laser 40 the beam 41 can be made to sweep across the plane of the bar code symbol 45 along a line 46. Just as in the embodiment of FIG. 1, light reflected from the bar code symbol 45 is detected by a photodiode 47 that produces an analog electrical signal on a line 48 to pass through a wave shaper to a decoder. The assembly of FIG. 6 can be mounted in a hand-held gun-shaped reader unit 35 as in FIG. 5, or in one of the reader housings of the type illustrated in the above-mentioned patents, incorporated herein by reference. The reader unit usually has a trigger switch 39 operated by the user to activate the laser source 40 and the photodetector 47 and its associated microprocessor and data transmission circuitry.

Tuning the wavelength of the laser 40 by an amount Δλ causes a change in the diffraction angle ΔΘ according to the relationship $$\Delta\Theta = (m/\alpha \cos \Theta)\Delta\lambda$$

where m is the diffraction order, α is the line pitch (i.e., for a grating with 1200 lines/mm, α is 1/1200 mm or approximately 0.8 μm), and Θ is the angle between the incident beam 41 and a line normal to the plane of the grating 43.

The angular resolution as limited by diffraction is $$\delta\Theta = (\lambda/N.\alpha \cos \Theta)$$

where N is the total number of lines in the grating. The number of resolvable spots is thus $$n_{spot} = \frac{\Delta\Theta}{\delta\Theta} = \frac{m}{\alpha\cos\Theta} \cdot \frac{\Delta\lambda N \cdot \alpha\cos\Theta}{\lambda} = \frac{mN\Delta\lambda}{\lambda}\bigg|_{m=1} = N\frac{\Delta\lambda}{\lambda}$$

For a 1-cm long diffraction grating 43 with 1200 lines/mm, N=12,000. It is relatively straightforward to achieve Δλ~50 Å for the tunable laser 40. Thus $$n_{spot} = 12,000 \cdot \frac{50 \text{ Å}}{6,700 \text{ Å}} \approx 90$$

For m=1, α cos Θ=0,5 μm, and Δλ=50 Å, the deflection resulting is $$\Delta\Theta = 0.01 \text{ rad} \approx 0.6°$$

To get a scan angle of ±15°, the optical magnification needed via lens system 44 is approximately fifty.

The method of tuning the laser 40 to obtain a variable wavelength for the output light beam 41 can be one several available. Semiconductor lasers can be wavelength tuned by various methods; some involve mechanical motion, and some do not require it. In any event, an electrical input on line 50 from a sweep signal generator 51, as in the form of a sawtooth shaped waveform, causes the laser source 40 to vary in wavelength output, which results in generation of the scan line 46.

Figure 7:
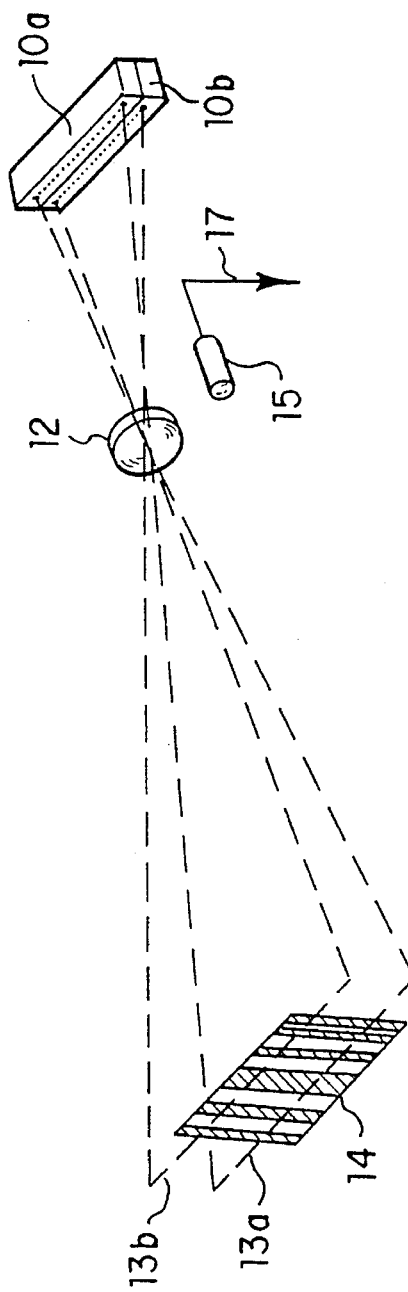
FIG. 7 is a diagram in schematic form of a bar code scanner employing dual linear array of light sources instead of a single array as in FIG. 1, according to another embodiment of the invention.
Figure 9:
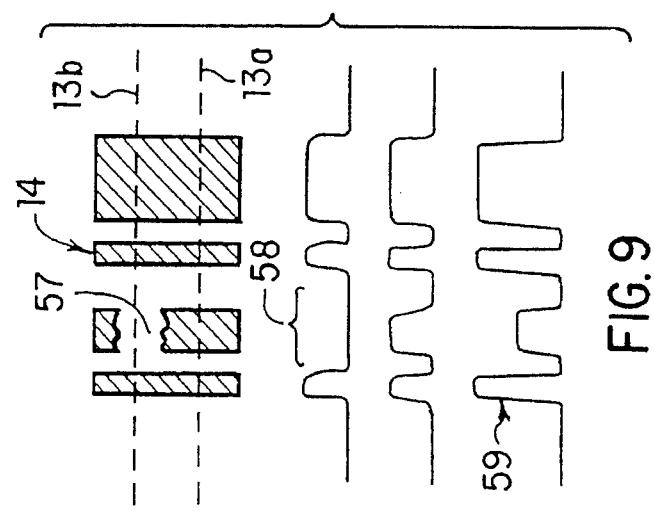
FIGS. 9 and 10 are timing diagrams showing events or voltage vs. time for certain occurrences in the system of FIG. 7 illustrating compensation for faults in the bar code.
Figure 8:
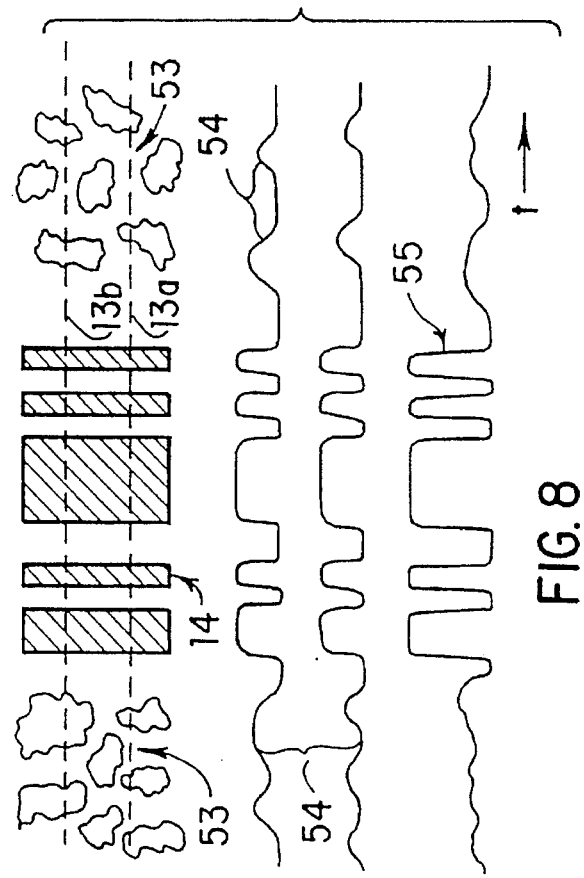
FIG. 8 is a timing diagram showing events or voltage vs. time for certain occurrences in the system of FIG. 7 illustrating the cancellation of background noise.
Figure 10:
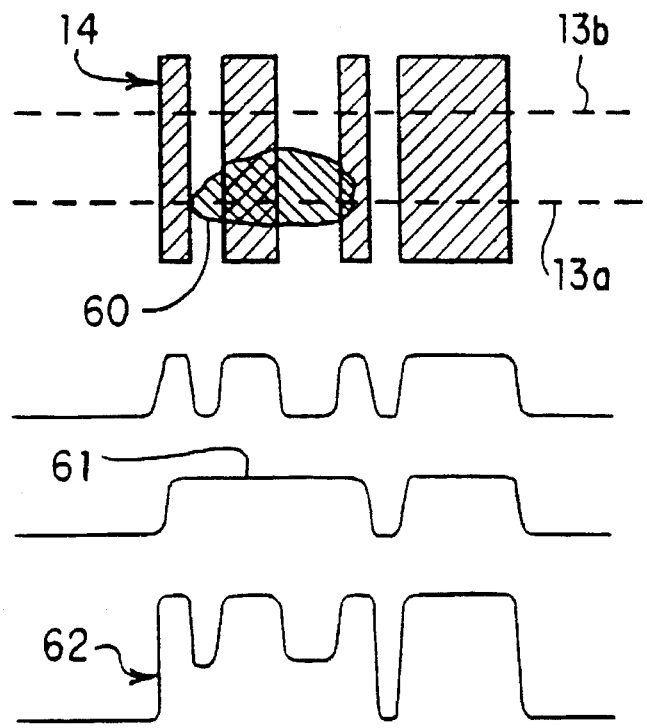

Referring to FIG. 7, another embodiment of the invention is illustrated wherein two of the linear arrays 10 and 10b are employed instead of only one as was the case in the embodiment of FIG. 1. The construction of the remaining parts of the system are the same as in FIG. 1. Use of two arrays 10a and 10b provides two scan lines 13a and 13b, one above the other, separated from one another by a distance corresponding to the physical separation of the arrays 10a and 10b and the magnification in the optical system 12. This dual scan dine technique may be advantageously employed in several ways. First, if the two rows of laser diodes 11 in the two arrays 10a and 10b are activated in parallel, in the same sequence, then the two scan lines 13a and 13b are likewise in sync; in this case if the two scan lines traverse the same bar code symbol 14, the reflected light received by the photodetector 15 is also in sync from the two scans 13a and 13b. The advantage of having two scan lines may be understood by reference to FIG. 8, where the background areas 53 are seen to return uncorrelated signals 54, whereas the bar code symbol returns correlated waveforms from the two parts of the symbol 14 being scanned by the two scan lines 13a and 13b. The single detector 15 collects reflected light from the two scans at the same time and sums the intensities of the reflections, so the contrast of the overall signal 55 detected from the bar code 14 is enhanced. On the other hand, the areas 53 outside the bar code symbol 14 will result in different signals, and so the overall contrast from these areas is reduced. The digitizing circuitry used to shape the analog waveform on the line 17 and recover the bar code information can more readily distinguish the transitions in the bar code region of the signal from the uncorrelated returns from the areas 53. Referring to FIGS. 9 and 10, another advantage to the dual scans of FIG. 7 is that bar code imperfections can be compensated for. If the bar code symbol 14 has a defect in the form of a gap 57 as seen in FIG. 9, then the signal returned by the scan line 13b would have a corresponding false area 58 whereas the return from the scan line 13a would be valid. The composite signal 59 on the line 17 at the output of the photodiode 15 would still be able to be interpreted to recover valid data. Similarly, as illustrated in FIG. 10, if the defect is in the form of a black spot 60, the light return for one scan line will have a false area 61 appearing as if there was a very wide bar in the symbol, but the composite electrical signal 62 representing the sum of both scans 13a and 13b has distinct transitions and can be decoded to produce valid bar code data.

Figure 11:
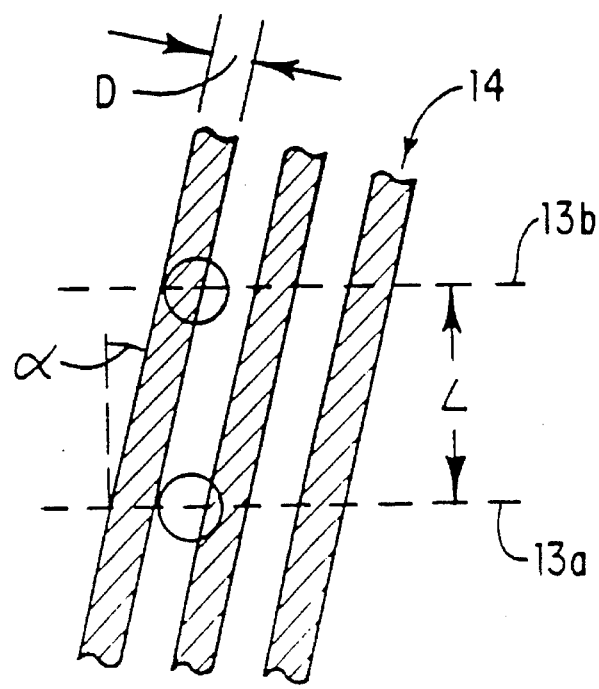
FIG. 11 is an enlarged view of a bar code symbol being scanned by dual light beams, illustrating permissible tilt.

When two scan lines 13a and 13b are used as illustrated in FIG. 7, the scan lines should be perpendicular to the individual bars of the symbol 14. The permissible misalignment depends upon the bar code density and the amount of physical separation between the two scan lines 13a and 13b. Referring to FIG. 11, assuming the diameter of the spot in the scan lines 13a or 13b to be larger than the minimum width D of a bar (or space), the maximum permissible tilt angle $\alpha$ is given by $$\tan \alpha \approx (0.5D)/L$$

where L is the separation between the two scan lines 13a and 13b.

Figure 13:
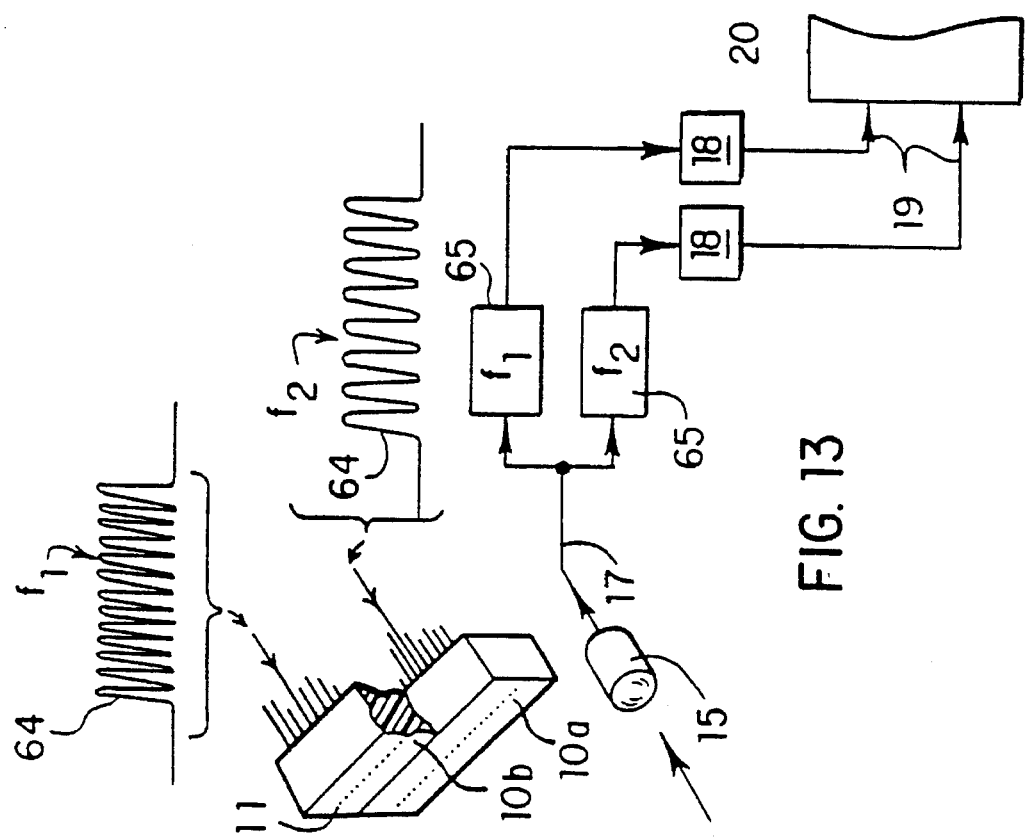
FIG. 13 is a pictorial view of a bar code scanner system corresponding to FIG. 7 but with two rows of light sources activated with signals of different frequency according to another embodiment of the invention.
Figure 12:
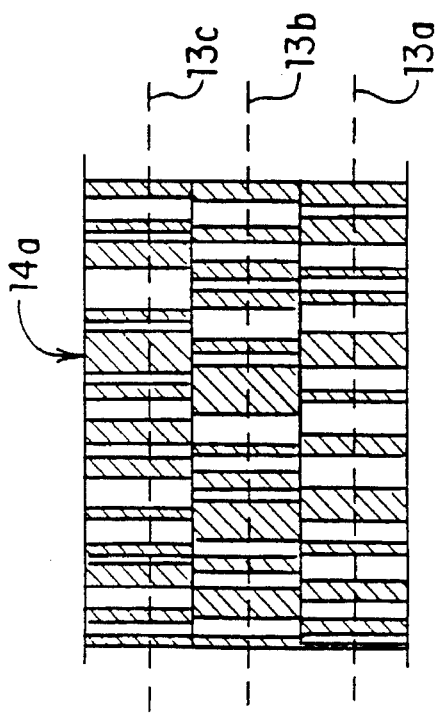
FIG. 12 is a plan view of a multiple-row bar code symbol being scanned by multiple scan lines according to another embodiment of the invention.

In FIG. 7 an embodiment of the invention is shown having two arrays 10a and 10b, producing two scan lines 13a and 13b, but the number can be larger than two. Three or more scan lines provide the same types of benefits as just discussed, but to a greater degree. In addition, however, the capability of simultaneously scanning multiple bar code patterns is available. With reference to FIG. 12, three scan lines 13a, 13b and 13c are shown focused upon a bar code symbol 14a having three rows of patterns as set forth in U.S. Pat. No. 4,794,239. This is a Code-49 type of symbol that may have up to eight rows of patterns. Although only three scan lines 13a, 13b and 13c are shown in FIG. 12 for illustrative purposes, it is noted that many more scan lines may be advantageously used in this embodiment of the multiple scan line feature of the invention. Previously, a single-scan reader was used to repeatedly scan the Code-49 type of symbol until an indicator light or buzzer told the user that a complete and valid decode had been obtained. Or, as set forth in pending application Ser. No. 317,533, filed Mar. 1, 1989, by Krichever & Metlitsky, assigned to Symbol Technologies, Inc., incorporated herein by reference, the detector was a vidicon type of imager instead of a single photodetector 15, and the symbol was not scanned but instead was illuminated in its entirety. The speed of the scan provided by this invention, however, allows the multiple scans of multiple rows to be distinguished merely by activating one row at a time, in a sequence of rows. That is, the laser diodes 11 for array 10a for scan line 13a are activated in sequence (while the diodes for all the other arrays are deactivated), then the diodes for array 10b, then for array 10c, etc. Therefore, only one photodetector 15 can be used since at any given instant only one laser diode 11 is activated and thus only one spot on the bar code symbol 14 is illuminated. Another way of distinguishing the reflected light so more than one scan line can be simultaneously activated is to generate light spots of different wavelengths or modulated with different frequencies, then separate the reflected light by optical or electrical filters. As illustrated in FIG. 13, for example, the individual laser diodes in one row may be activated by a burst of a given frequency indicated by the waveform 64, instead of by a rectangular pulse of constant voltage level, and diodes 11 in another row activated by a similar burst but of a different frequency, then bandpass filters 65 responsive to these frequencies placed in the path from the photodetector 15 to produce separate simultaneous inputs to the microprocessor 20 representing the returns from the bar code symbol for the two different scan lines. Similarly, instead of frequency division multiplexing as illustrated in FIG. 13, time division multiplexing may be employed wherein the light-emitting diodes 11 of rows 10a and 10b are alternately activated, one at a time, then the return signal on line 17 is switched in synchronization with the alternate activation to produce two separated data streams; this switching can be done by the microprocessor 20 or by circuitry prior to the microprocessor input.

In another embodiment of the concept of using scan generation with no moving parts, and using multiple scan lines, the number of rows in the array may be increased to create a complete raster-scan type of system. That is, as seen in FIG. 14, the array 10 may be a semiconductor chip containing a matrix of laser diodes or light-emitting diodes, perhaps (as an example) twenty-five rows by one hundred diodes per row (2500 diodes in this example, although a larger number may be needed for ample resolution), and the diodes activated one at a time; this arrangement creates a two-dimensional field of view at the focal plane where the bar code symbol 14 is expected to be, similar to the two-dimensional scanning features set forth in the above-mentioned copending application Ser. No. 317,533. This arrangement of FIG. 14 is particularly adapted for use with multi-row bar code symbols such as employed in Code-49 where rows of bar code characters are stacked one above the other. First, the position and orientation of the bar code may be found within the field 66 by a rapid but incomplete scan of the field (only perhaps one in five or one in ten of the diodes 11 activated) without attempting to decode but merely looking for the general characteristics of bar code symbols such as transitions per unit length. Then, only the localized area of the field 66 where the bar code symbol 14 is located is scanned with activation of each diode in sequence, generating a set of scan lines positioned to intercept the rows of the bar code symbol 14. Note that the angular orientation of the scan lines 13a, 13b, etc., need not be parallel to the rows of diodes 11 but can be skewed to correspond to the orientation of the symbol 14 within the field 66; a scan line would be skewed by activating a sequence of diodes that are not necessarily in the same row but instead define a straight line in the matrix of diodes.

Referring now to FIG. 15, a bar code scanner may produce dual scan lines 13a and 13b as in FIG. 7, but, according to another embodiment of the invention, the dual scan lines are produced by a single light source 68 emitting a beam 69 that passes through a beam splitter 70 to generate two separate beams 71 and 72. The two beams are directed to a scanning mirror 73 driven by a motor 74, from which the beams are directed out through a suitable lens system 75 to impinge upon the bar code symbol 14 as the two scan lines 13a and 13b. The assembly of FIG. 15 is mounted in a hand-held housing as in FIG. 5, or a stationary housing, as disclosed above. The embodiment of FIG. 15 operates to provide improved resolution and decoding as discussed above with reference to FIGS. 8, 9 and 10.

As disclosed above with reference to FIG. 7, the number of scan lines utilized in the embodiment of FIG. 15 is not limited to the two scan lines 13a and 13b illustrated, but instead may be more than two scan lines 13a, 13b and 13c such as illustrated in FIG. 12 for a two dimensional bar code symbol, or, as illustrated in FIG. 16, a number of scan lines 13a, 13b and 13c may be advantageously used to scan a conventional bar code symbol 14 to obtain greater resolution, fault correction, etc. These three scan lines 13a, 13b and 13c are generated by a single light source using a beam splitter and a mechanical scan mirror as in FIG. 15.

Referring now to FIG. 17, a bar code scanner system is illustrated employing multiple simultaneous scan lines 13a, 13b and 13c repeated to create a raster type of scan. The scan is generated in this case using mechanical means in the form of a mirror 76 rotated about a vertical axis 77 to produce the horizontal traces and also rotated about a horizontal axis 78 to produce the vertical movement of the three scan lines; there may be, for example, twenty horizontal traces (three scan lines per trace for a total of sixty) for each vertical frame, whereby a field 79 is scanned once each frame. Although three scan lines 13a, 13b and 13c are shown in FIG. 17, it is understood that any number n of scan lines might be used, and the scanning frequency of the mechanical deflecting elements is reduced by a factor of n. The ability to generate multiple scan lines during each cycle of oscillation or rotation of the mirror 76 allows the requirements for construction of the mirror drive mechanism to be less stringent. That is, the drive mechanism can be smaller, lighter, less costly, and use less power, because it is operating at one-third the speed. The dwell time of a light spot in a scan line 13a, 13b or 13c is also longer, allowing increased resolution and/or lower power requirements for the light generators. Three separate light emitting diodes or laser diodes 81, 82 and 83 are continuously activated during a scan of the field 79 at three separate frequencies $f_1$, $f_2$ and $f_3$; that is, the diodes are pulsed at three different frequencies in a manner similar to that illustrated in FIG. 13. As seen in FIG. 18, the three scan lines 13a, 13b and 13c make a trace from one side of the field 79 to the other, then retrace to begin again at a vertically-displaced position, as dictated by the indexing of the mirror 76 about the axes 77 and 78. The three separate spots of light creating the scan lines 13a, etc., are modulated at the same frequencies $f_1$, $f_2$ and $f_3$ as the light sources generating these spots, and so of course the reflected light from the spots is likewise modulated. A single photodetector 15 is responsive to light reflected from the field 79 for all three scan lines, and the analog electrical signal produced on the line 17 is applied to three band-pass filters 84, 85 and 86 tuned to $f_1$, $f_2$ and $f_3$, respectively, to recover the separate returns from the three scan lines 13a, 13b, and 13c. The outputs 87, 88 and 89 from the three band-pass filters are demodulated to remove the modulating frequencies and recover the envelope, and the demodulated signals applied to three separate wave-shaping or digitizing circuits 18 as before, then the shaped outputs 19 are applied as inputs to the microprocessor 20 for decoding. As set forth in the above-mentioned copending application Ser. No. 317,533, the digital data at these three inputs 19 may be stored in random access memory and then accessed in patterns other than the original raster scan pattern, so that if the bar code symbol 14 is located in the field 79 at an angle then the effective scan lines for interpreting the data in memory can be at the same angle. That is, the scan lines 13a, etc., need not be parallel to the pattern of the bar code symbol 14 to obtain a valid read and decode. Referring to FIG. 19, a bit-mapped image 79' of the field 79 stored in the memory 90 may contain an image 14' of the bar code symbol 14 that is tilted and foreshortened due to the fact that the reader housing 35 of FIG. 5 in which the embodiment of FIG. 17 is mounted is not aligned normal to the symbol. Thus, even though the data derived from line 17 is loaded into this memory by the microprocessor 20 in a regular pattern of rows 13a', 13b', etc., as the scan lines define the pattern, yet when accessed for decoding it is necessary to create pseudo-scan lines 91, 92, etc., (by suitable addressing of the memory) to generate signals for decode that are aligned with the rows of the bar code pattern 14. It is noted that the scan lines 13a, 13b and 13c are shown to be adjacent one another in FIGS. 17 and 18, but instead an interlaced scan pattern could be used in the raster scan of this embodiment.

The system of FIG. 17 employs three separate light sources 81, 82 and 83, but a single light source could be used along with a beam splitter 70 as in FIG. 15. In addition, an electro-optic light-modulating device would be placed in the path of each of the separate beams, downstream of the beam splitter. The light-modulating device would add a distinctive signal to each beam so that it could be recovered by a band-pass filter 84, 85 or 86 as before. The light-modulating devices may be, for example, ferroelectric liquid crystal, electro-optic or acousto-optic crystal gates.

Referring to FIG. 20, another embodiment of the invention is shown wherein multiple scan lines 13a, 13b, 13c and 13d are generated from a single laser source 68 by a liquid crystal device 94. As in FIG. 15, the beam 69 produced by the laser source 68 is split into multiple beams 95, and a mechanical device such as an oscillating mirror 73 moves these beams simultaneously across the area of the bar code symbol as the multiple scan lines 13a, etc. The liquid crystal device 94 has a voltage applied to it by lines 96 and 97, and the magnitude and frequency of the voltage determines the number of beams 95 produced and thus the number of scan lines. In this manner, the beam 95 may be dynamically changed from a single beam to a split beam, by varying a voltage source 98. For example, the signal produced on line 17 from the photodetector 15 may be of poor quality using one scan line, but may be decodable using multiple scan lines as discussed above with reference to FIGS. 8, 9 and 10, so the control program executed by the microprocessor 20 may cause the voltage generator 98 to switch to a multiple scan line condition if a valid decode is not obtained with one scan line. Alternatively, the control program may cause a switch from multiple scan to one scan line if more intensity is needed, since the beam splitting would reduce the level of illumination with a constant output of source 68.

Referring to FIG. 21, the liquid crystal device 94 may comprise two glass plates 99, each coated with a conductive film, and a liquid crystal material 100 sandwiched between the conductive plates. The material 100 may be, for example, a p-methoxy-benzylidene or p-n-butyl-aniline.

The liquid crystal device 94 of FIG. 20 is capable of spitting the beam 69 into more than two beams, and so the voltage source 97 may apply voltages of several levels to produce a selection of the number of scan lines needed, depending upon the conditions detected.

Although according to various features of the invention the scan generation may use oscillating mirrors, the embodiments of bar code scanner devices as with no moving parts as described above have several advantages for some purposes, when compared to scanners that use electromechanical components. First, the scan rate can be much faster, so the amount of time the laser is on can be reduced, lowering power drain. The faster speed will also allow a large number of scans to be accomplished for one "read" operation, then the data signals correlated with one another using a suitable algorithm to increase the precision of the decode. Second, the scan pattern can be flexibly adapted, i.e., the scan can be tailored to fit the particular bar code symbol and position; e.g., after an initial scan it is determined that the location and width of the bar code symbol in the field of view is at a specific place, and so the field is re-scanned at only this location, which will use less power. Third, after an initial scan there can be a re-scan of only a small part that showed an ambiguous decode, attempting to get a valid decode of only the troublesome part. Fourth, improvements in reliability can be provided in a device with no moving parts but instead implemented with only electronic components and flexed optical devices.

In another aspect, the bar code scanner methods disclosed above wherein multiple scan lines are employed provide other features of importance. The reliability of the decoding process can be enhanced by producing a composite signal from multiple simultaneous scans, where the effects of noise or defects can be minimized. Or, the increased scanning speed permitted by the use of no moving parts allows the multiple scans to be sequential, one line at a time, which allows the reflected light from the multiple scan lines to be separated when using only one photodetector; this arrangement permits scanning of multiple-row bar code symbols or the like.

While this invention has been described with reference to specific embodiments, this description is not meant to be construed in a limiting sense. Various modifications of the disclosed embodiments, as well as other embodiments of the invention and variations in the character of the disclosed or other embodiments, will be apparent to persons skilled in the art upon reference to this description. It is therefore contemplated that the appended claims will cover any such modifications or embodiments, or variations therein, as fall within the true scope of the invention.

What is claimed is:

1. A bar code scanner, comprising:

a) a scanning light beam generator for simultaneously producing a plurality of scan lines at different frequencies to impinge upon a bar code symbol or other symbol which encodes data using variations in light reflectivity, wherein said light beam generator includes an array of light emitting elements which are activated in a predetermined sequential order;

b) a sensor, responsive to the scan lines reflected from the bar code symbol, for detecting light reflected from said bar code symbol and for producing an electrical signal representing data represented by said symbol; and c) a decoder which decodes the electrical signal produced by the sensor to generate a decoded signal indicative of the information contained in the symbol, wherein said decoder includes means for demultiplexing said electrical signal to recover separate signals for each scan line.

2. A bar code scanner, comprising;

a) a scanning light beam generator for simultaneously producing a plurality of scan lines to impinge upon a bar code symbol or other symbol which encodes data using variations in light reflectivity, wherein said light beam generator includes an array of light emitting elements, which are activated in a predetermined sequential order and wherein said scan lines are modulated at different frequencies;

b) a sensor, responsive to the scan lines reflected from the bar code symbol, for detecting light reflected from said bar code symbol and for producing an electrical signal representing data represented by said symbol, wherein said electrical signal is filtered to separate responses to said plurality of scan lines; and c) a decoder which decodes the electrical signal produced by the sensor to generate a decoded signal indicative of the information contained in the symbol.

3. A bar code scanner according to claim 2 wherein said elements are in at least one linear array and each linear array is activated in sequence beginning at one end and continuing in a regular pattern to the other end.

4. A bar code scanner according to claim 2 wherein said multiple scan lines are repeated in a raster scan pattern.

5. A bar code scanner according to claim 2 wherein said multiple scan lines are generated by different light sources.

6. A method of reading a symbol comprising the steps of:

(a) simultaneously directing a plurality of light beam scan lines modulated at different frequencies emitted from an array of light emitting elements to a target field where said symbol may be present;

(b) detecting light reflected from said field from the plurality of scan lines;

(c) producing an electrical signal corresponding to the reflected light from said plurality of scan lines; and (d) filtering the electrical signal to separate responses corresponding to respective ones of the plurality of scan lines.

7. A method of reading a symbol according to claim 6 further including the step of decoding the filtered electrical signal to generate a decoded signal indicative of the information contained in the symbol.

8. A scanner comprising:

a) a scanning light beam generator for simultaneously producing a plurality of scan lines modulated at different frequencies to impinge upon a symbol which encodes data using variations in light reflectivity, wherein said light beam generator includes an array of laser diodes which are activated in a predetermined sequential order;

(b) a sensor for receiving said light from said symbol and for producing an electrical signal representing data represented by said signal; and (c) a filter for filtering the electrical signal to separate responses to said plurality of scan lines.

9. A bar code scanner according to claim 8 further comprising a decoder which decodes said electrical signal produced by said sensor to generate a decoded signal indicative of the information contained in said symbol.

10. A bar code scanner according to claim 8 wherein said predetermined sequential order comprises turning on the first light emitting element in a row of said array, then turning off said first light emitting element and turning on the immediately adjacent light emitting element in the same row and continuing to turn off and turn on the adjacent light emitting element until the entire row has been traversed.

11. A bar code scanner, comprising:

a) a scanning light beam generator for simultaneously producing a plurality of scan lines at different frequencies to impinge upon a bar code symbol or other symbol which encodes data using variations in light reflectivity, wherein said light beam generator includes a plurality of light emitting elements;

b) a mirror positioned between the scanning light beam generator and the bar code symbol for reflecting the scan lines toward the bar code symbol; and c) a sensor, responsive to the scan lines reflected from the bar code symbol, for detecting light reflected from said bar code symbol and for producing an electrical signal representing data represented by said symbol.

12. The bar code scanner as claimed in claim 11 wherein the light emitting elements are light emitting diodes.

13. The bar code scanner as claimed in claim 11 wherein the light emitting elements are laser diodes.

14. The bar code scanner as claimed in claim 11 further including filter means for demodulating the electrical signal to recover separate signals for each scan line.

* * * * *

UNITED STATES PATENT AND TRADEMARK OFFICE
CERTIFICATE OF CORRECTION

PATENT NO. : 5,545,886
DATED : August 13, 1996
INVENTOR(S) : Boris Metlitsky, et. al.

It is certified that error appears in the above-indentified patent and that said Letters Patent is hereby corrected as shown below:

Title page, item [54] and col. 1, line 1, change "BARCODE" to --BAR CODE--.

Column 12, claim 8, line 64, change "seguential" to --sequential--.

Signed and Sealed this

Twenty-second Day of October, 1996

Attest:

BRUCE LEHMAN

*Attesting Officer*     *Commissioner of Patents and Trademarks*